US 6,539,370 B1

(12) United States Patent
Chang et al.

(10) Patent No.: US 6,539,370 B1
(45) Date of Patent: Mar. 25, 2003

(54) DYNAMICALLY GENERATED HTML FORMATTED REPORTS

(75) Inventors: Sandra Sheu Chang, San Jose, CA (US); Randy Yuan-Yi Tung, San Jose, CA (US); May Ngun Wone, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/192,030

(22) Filed: Nov. 13, 1998

(51) Int. Cl.[7] .............................................. G06F 17/30
(52) U.S. Cl. ........................... 707/2; 707/3; 707/103 R; 707/501.1; 707/513
(58) Field of Search ....................... 707/1–10, 103 R, 707/513, 501.1; 345/352, 354

(56) References Cited

U.S. PATENT DOCUMENTS

| | | | | |
|---|---|---|---|---|
| 5,423,033 A | * | 6/1995 | Yuen | 395/600 |
| 5,634,121 A | | 5/1997 | Tracz et al. | 395/602 |
| 5,706,434 A | | 1/1998 | Kremen et al. | 395/200.09 |
| 5,710,900 A | * | 1/1998 | Anand et al. | 395/339 |
| 5,710,918 A | | 1/1998 | Lagarde et al. | 395/616 |
| 5,724,595 A | | 3/1998 | Gentner | 395/762 |
| 5,734,831 A | | 3/1998 | Sanders | 395/200.53 |
| 5,737,592 A | | 4/1998 | Nguyen et al. | 395/604 |
| 5,745,889 A | | 4/1998 | Burrows | 707/2 |
| 5,745,890 A | | 4/1998 | Burrows | 707/3 |
| 5,745,898 A | | 4/1998 | Burrows | 707/101 |
| 5,745,899 A | | 4/1998 | Burrows | 707/102 |
| 5,745,900 A | | 4/1998 | Burrows | 707/102 |
| 5,748,188 A | | 5/1998 | Hu et al. | 345/326 |
| 5,754,772 A | | 5/1998 | Leaf | 395/200.33 |
| 5,765,158 A | | 6/1998 | Burrows | 707/101 |
| 5,778,178 A | | 7/1998 | Arunachalam | 395/200 |
| 5,778,367 A | | 7/1998 | Wesinger, Jr. et al. | 707/10 |
| 5,784,608 A | | 7/1998 | Meske, Jr. et al. | 395/602 |
| 5,787,416 A | | 7/1998 | Tabb et al. | 707/2 |
| 5,793,966 A | | 8/1998 | Amstein et al. | 395/200.33 |
| 5,801,702 A | | 9/1998 | Dolan et al. | 345/357 |
| 5,832,452 A | * | 11/1998 | Schneider et al. | 705/5 |
| 5,960,196 A | * | 9/1999 | Carrier, III et al. | 395/701 |
| 5,974,416 A | * | 10/1999 | Anand et al. | 707/10 |
| 6,055,541 A | * | 4/2000 | Solecki et al. | 707/103 |
| 6,078,924 A | * | 6/2000 | Ainsbury et al. | 707/101 |
| 6,131,098 A | * | 10/2000 | Zellweger | 707/102 |
| 6,205,440 B1 | * | 3/2001 | Nusbickel | 707/2 |

FOREIGN PATENT DOCUMENTS

GB            2248370 A    *  1/1992

OTHER PUBLICATIONS

Microsoft Press, "Computer Dictionary" Third Edition, pp. 305–306, 1997.*

(List continued on next page.)

Primary Examiner—Jean R. Homere
Assistant Examiner—Khanh Pham
(74) Attorney, Agent, or Firm—Raymond E. Roberts; Intellectual Property Law Offices (57) ABSTRACT

A report generating and viewing method (10) for generating and viewing reports (72) over the internet (16). A request from a browser (14) is sent to a server (12) whereupon a generate reports program (38) in a server (12) creates an intermediate file (44) containing all the necessary data and metadata. When a request from the browser (14) to view the report (72) is sent, a view reports program (60) in the server (12) parses the intermediate file (44) and sends a menu (66) to the browser (14). The user then selects a report from the menu (66) and the server (12) sends the report (72) to the browser (14).

19 Claims, 5 Drawing Sheets

OTHER PUBLICATIONS

1997 IEEE Data Storage and Query Processing for Structured Document Databases, 0/97,Kyushu University, Fukuoka, Japan pp. 92–97.

1997 IEEE Data Warehousing within Intranet: Prototype of a Web–based Executive Information System, 0/97, Vienna University of Technology, Vienna, Austria pp. 627–632.

1997 IEEE Towards Creating a Knowledge Base for World–Wide Web Documents, 3/97, Linkoping University, Linkoping, Sweden pp. 507–511.

1998 IEEE Global Integration of Visual Databases, 2/98, State University of New York at Buffalo, NY and Xerox Research Center, Webster, NY pp. 542–549.

1998 IEEE Using Metadata to Query Passive Data Sources, Proc. 31st Annual Hawaii International Conference on System Sciences pp. 286–294.

* cited by examiner

DYNAMICALLY GENERATED HTML FORMATTED REPORTS

COPYRIGHT NOTICE

A portion of the disclosure of the patent document contains material which is subject to copyright protection. The owner, International Business Machines Corporation, has no objection to the facsimile reproduction by any one of the patent disclosure, as it appears in the Patent and Trademark Office patent files of records of any country, but otherwise reserves all rights whatsoever.

RELATED APPLICATIONS

This application is related to a copending application entitled Navigation Method for Dynamically Generated HTML Pages, filed on even date herewith, which is incorporated herein by reference, in its entirety.

1. Technical Field

The present invention relates to the field of computer data communications and more specifically to a method and system for providing dynamically generated Hyper Text Markup Language ("HTML") formatted reports from large amounts of data which is extracted from a Standard Query Language ("SQL") database. The predominant current usage of the present inventive HTML formatted reports generation method is in the customized generation of reports over the internet, or like data communications channels.

2. Background Art

One of the uses to which the internet is applied is the querying of data bases which are available over the internet. The accessing of data bases over the internet presents some problems that are not present when a user accesses a data base directly at a local computer. Primary among these is that connection time must be limited over the internet in order to maximize the available bandwidth of the server, internet service provider ("ISP") facilities, network communications means, and the like.

One method that has been used in the prior art to use a common gateway interface ("CGI") program to query the database and to produce a report which is then returned to the requesting user. This method is, however, slow and requires a great deal of processing time. Moreover, once a report is generated it must either be kept in the server's memory (which will require a very great amount of storage space when many such custom reports are generated) or else the entire process will have to be repeated each time such a report is requested.

It would desirable to have a method for generating and providing data base reports over the internet which is both relatively quick and relatively economical of internet and server resources. However, to the inventors' knowledge, no such method or means has existed in the prior art.

DISCLOSURE OF INVENTION

Accordingly, it is an object of the present invention to provide a method for generating data base reports which will minimize repetitive operations each time such reports are requested. It is still another object of the present invention to provide a method for generating data base reports which will require less server storage space as compared to saving such reports after they are first generated.

It is yet another object of the present invention to provide a method for generating data base reports which is easy to use and reliable in operation.

Briefly, the inventive method separates the data extraction/processing step from the report formatting step by adding an intermediate step to write the culled data into what is called a 'intermediate files', which use a meta language to describe the data. Then, on demand, a variety of HTML reports can be dynamically generated by parsing the metadata statements and data from the intermediate files. All subsequent requests to view these reports are dynamically generated from the intermediate files. The metadata statements efficiently describe the data, in that multiple reports may be generated from a set of metadata statements. Using a unique file format, unnecessary reprinting of data in the intermediate files is avoided. Such intermediate files require far less storage space in the server than would be required to store pregenerated reports. However, the provision of the intermediate files will greatly enhance performance when a report is requested, since it will not be necessary to query the entire database to obtain the information necessary to generate the report.

An advantage of the present invention is that the amount of server storage capacity that is required in order to quickly provide data base reports is reduced.

A further advantage of the present invention is that the speed of producing reports is increased as compared to culling the required data from the data base upon each request therefor.

Still another advantage of the present invention is that data base information from essentially any type of data base can be made available to essentially any desired user over the internet.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s)coded in accordance with the invention.

The best presently known mode for carrying out the invention is a report generation and viewing system and method. The inventive report generating and viewing method is depicted in a flow diagram in FIG. 1 and is designated therein by the general reference character 10.

Figure 2:
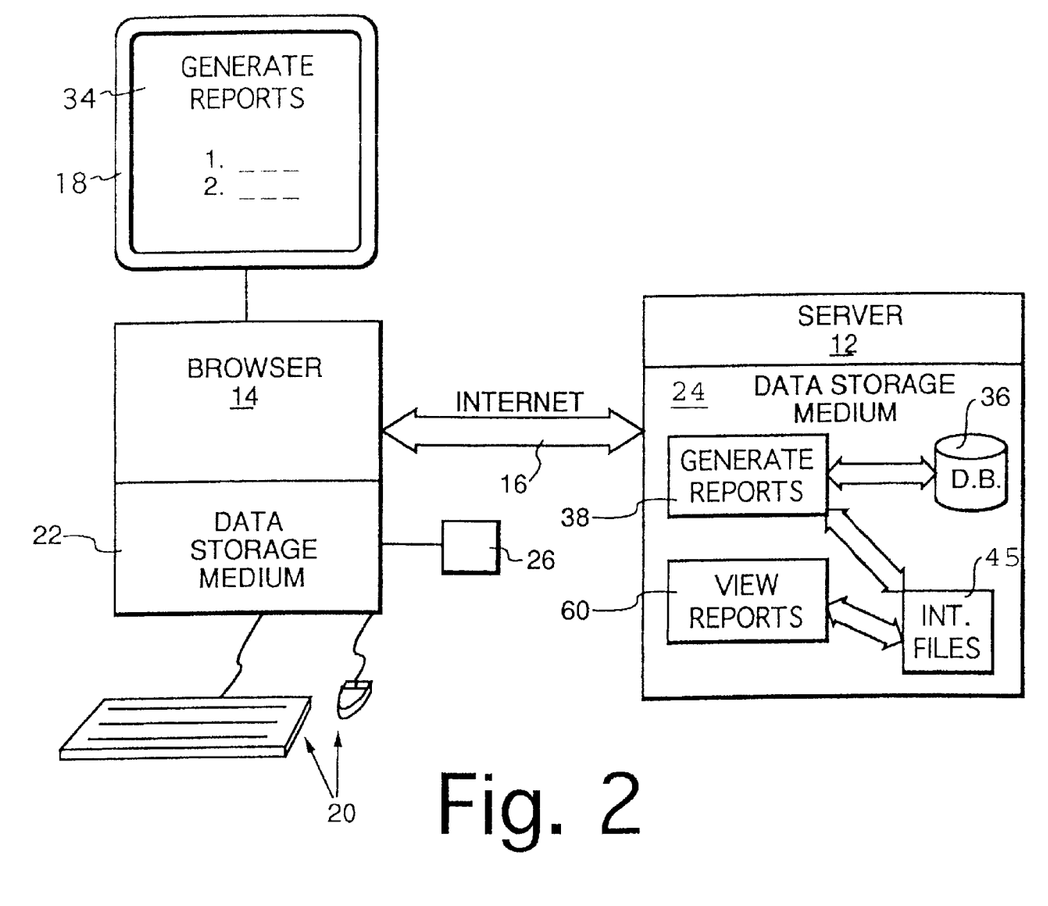
FIG. 2 is a block diagram of an internet/server/browser component arrangement.

FIG. 2 is a block diagram showing relevant portions of the content of a server 12 and browser 14 connected over the internet 16. As shown in the view of FIG. 2, some relevant portions of the browser 14 are a display screen 18 and input devices 20 (generally a keyboard and a mouse). A browser data storage medium 22 will consist of data storage space for containing program code to perform the present inventive functions, and also for containing data used in relation to such operations. The server 12 will generally be similarly appointed and will specifically have a server data storage medium 24 which also will consist of data storage space for containing program code to perform the present inventive functions, and also for containing data used in relation to such operations. Both the browser data storage medium 22 and the server data storage medium 24 may optionally and/or additionally include a removable medium 26 such that the code for performing the present inventive functions and/or data pertaining thereto may thereby be inserted into the browser 22 and server 24 respectively and/or removed therefrom.

Figure 1:
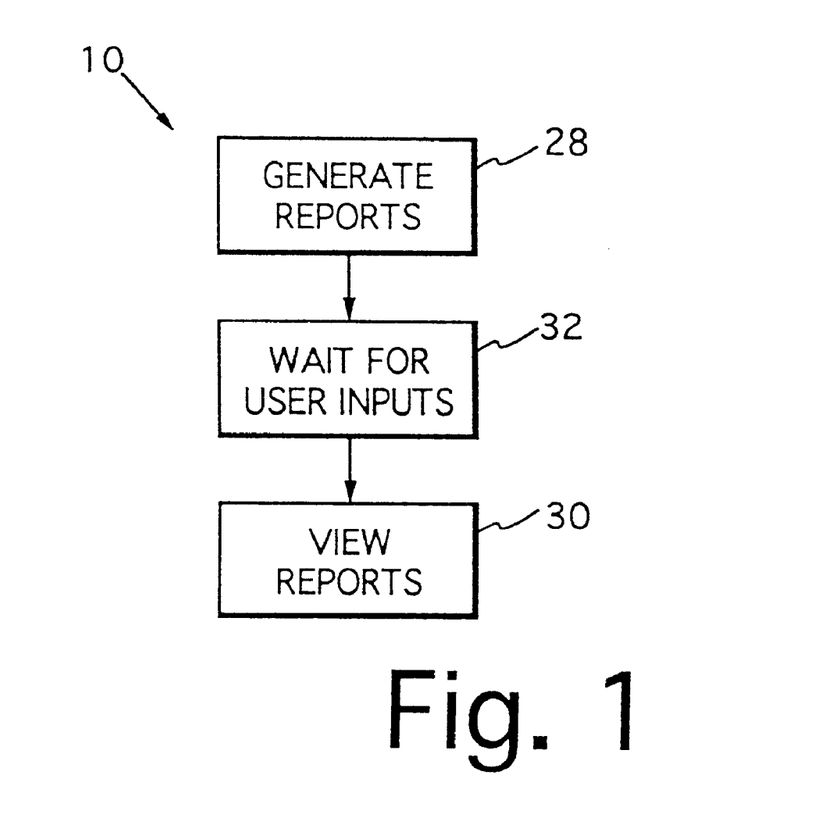
FIG. 1 is a high level flow diagram showing an example of the inventive report generation and viewing method.

As can be seen in the view of FIG. 1, the inventive method 10 has two basic elements. These are a generate reports operation 28 and a view reports operation 30. A wait for user input 32 indicates that the generate reports operation 28 need not immediately or automatically be followed by the view reports operation 30. For example, in some cases only certain persons might be authorized to initiate the generate reports operation, while the view reports operation 30 might be accessible to a wider audience. In this regard, it should be noted that the generate reports operation 28 and the view reports operation 30 need not even be accomplished form the same browser 14, and multiple browsers 14 (not shown) might also generally simultaneously initiate the operations described herein.

In the generate reports operation 28 (FIG. 1) a user will be presented with an applet (shown, by way of example, as a generate reports menu 34 shown on the display screen 18 of FIG. 2). The applet will be readily customized to a particular application to provide a list of reports available from a particular data base 36 along with an associated HTTP post request which will link to a generate reports program in the server 12. A generated uniform resource locator ("URL") will have parameters to indicate, to the generate reports program 38, which options have been selected at the browser 14. A simple example of such a URL might be: http://servername/reportgen?&type1.

Figure 3:
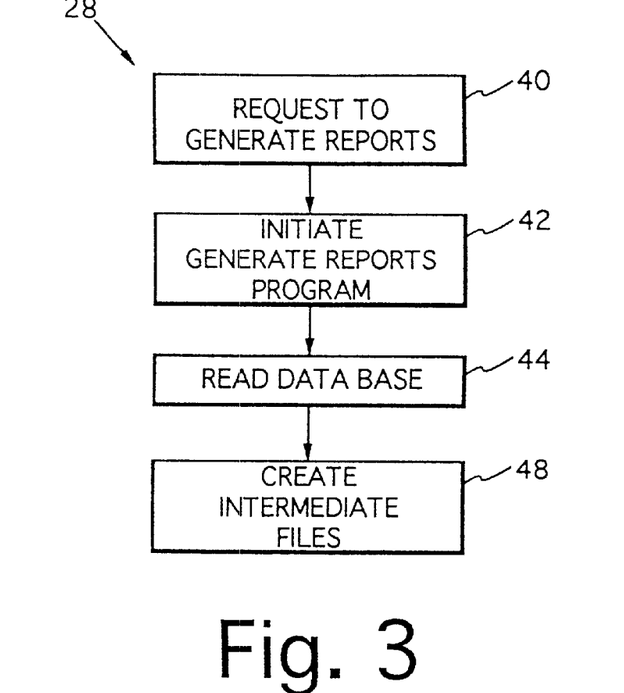
FIG. 3 is a more detailed block diagram showing the operations of the generate reports operation of FIG. 1.

FIG. 3 is a more detailed block diagram showing an example of the subparts of the generate reports operation 28 of FIG. 1. When it is decided by an authorized user that it is desired to produce reports which will then be available to users, the user selects one or more items from the generate reports menu 34 in a request to generate reports operation 40. Thereupon a URL, which is exclusively associated with the particular report(s) desired, is sent from the browser 14 onto the internet 16 and received at the server 12 in an initiate generate reports program operation 42. The generate reports program 38 (FIG. 2) will then read the necessary data from the data base 36 in a read data base operation and then generate one or more intermediate files 46, as will be discussed in more detail hereinafter, in a create intermediate files operation 48. As discussed previously herein in relation to FIG. 1, the intermediate files will then be stored in the data storage medium 24 of the server, awaiting initiation of the view reports operation 30 by a user.

Figure 4:
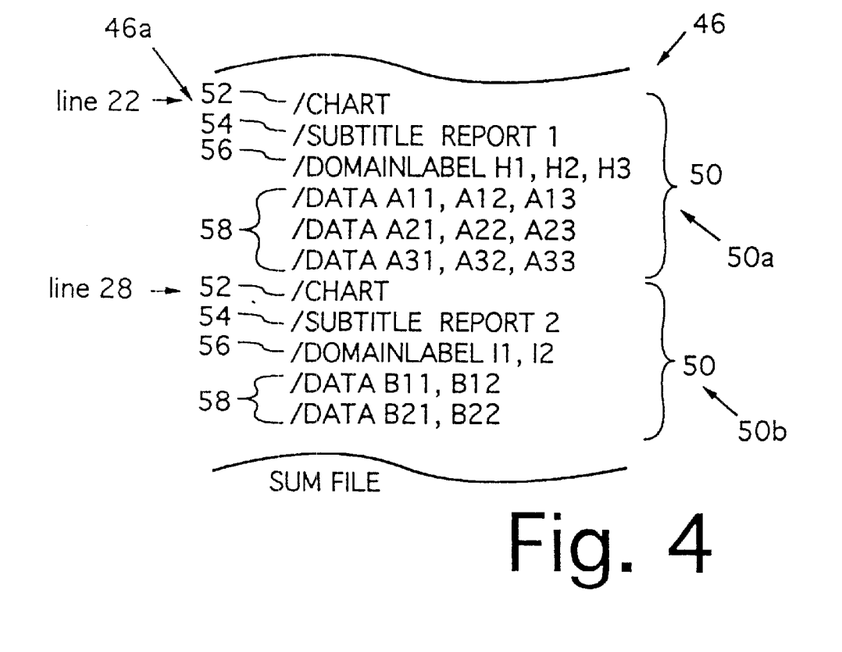
FIG. 4 is an example of the content of a simple intermediate file according to the present invention.

Regarding the format of the intermediate files, FIG. 4 is an example of a simple intermediate file 46. Although this type of file might take any of many forms or formats while remaining within the scope of the invention, the particular format of this example is referred to by the inventors as a SUM file 46a and is identified by the appended by the suffix "SUM". It will be noted that the SUM file includes metadata to define the structure of the data therein. The particular SUM file 46a of this example has two report sections 50 (50a and 50b), each of which is headed by a /CHART entry 52. The /CHART entry 50 serves to allow the generate reports program (FIG. 2) to recognize the beginning of each report section 50. Each report section 50, also has a /SUBTITLE entry 54. It will be noted that, in this example, the subtitles of the two report sections 50a and 50b are "Report 1" and "Report 2", respectively. Each report section 50, also has a /DOMAINLABEL entry 56, which lists domain names that will generally be column headings in a report printout of this data. It will be noted that, in this example, the column headings data for the first report section 50a is H1, H2 and H3. Furthermore, in this example, the column headings data for the second report section 50b is I1 and I2. In actual practice, it is anticipated that such column headings might often be more descriptive of the data that is to be listed in corresponding columns of a printed report.

Each of the report sections 50 also has a plurality of /DATA entry lines 58. In this example, it will be noted that the first report section 50a has three of the /DATA entry lines 58, while the second report section 50b has two of the /DATA entry lines 58. The quantity of the /DATA entry lines will generally correspond to the number of entries in a column under each of the headings of a report. It should be noted that the data shown in this example in each of the /DATA entry lines 58 represents the placement of such data in a printout. That is, for example, A32 is meant to indicate that data in this position will correspond to the third row entry in the second column (under the domain label H2, in this example). In actual practice, it is anticipated that the data in such locations will constitute the information which the user wishes to obtain from the report, rather than merely reciting the position of such data in the report as does the data of this example.

It should be noted that additional lines Data Entry of may readily placed within the intermediate file 46. Indeed, it is anticipated by the inventors that it may be convenient to place lines within the intermediate file 46 so as to make the intermediate file 46 format compatible with other data files that might be used in conjunction with, or in the same environment as this present invention.

Figure 4A:
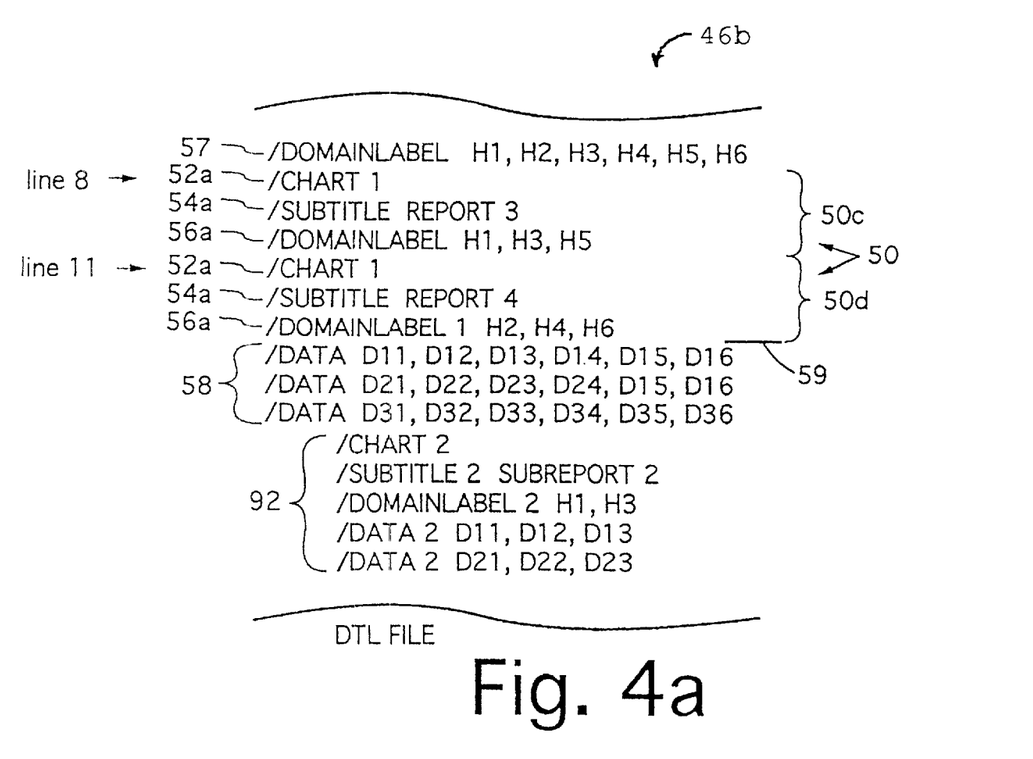
FIG. 4a is an example of the content of a simple alternate intermediate file type according to the present invention.

FIG. 4a is a is an example of an alternate intermediate file 46b such as might be used in conjunction with the present inventive method. Although this type of file might take any of many forms or formats while remaining within the scope of the invention, the particular format of this example is referred to by the inventors as a detail file 46b and is identified by the appended by the suffix "DTL". It will be noted that the DTL file also includes metadata to define the structure of the data therein. The particular DTL file 46b of this example has two report sections 50 (50c and 50d), each of which is headed by a /CHART1 entry 52a. The /CHART1 entry 52a serves to allow the generate reports program (FIG. 2) to recognize the beginning of each report section 50. Each report section 50, also has a /SUBTITLE1 entry 54a.

It will be noted that, in this example, the subtitles of the two report sections 50c and 50d are "Report 3" and "Report 4", respectively. Each report section 50, also has a /DOMAINLABEL1 entry 56a, which lists domain names that will generally be column headings in a report printout of this data. It will be noted that, in this example, the column headings data for the report section 50c is H1, H3 and H5. Furthermore, in this example, the column headings data for the report section 50d is H2, H4 and H6. In the DTL file 46b, a master /DOMAINLABEL entry 57 provides all of the headings for which data is provided in this particular example of the DTL file 46b.

In the DTL file 46b, generally following the report sections 50 are a plurality of the /DATA entry lines 58. In this example, it will be noted that the DTL file 46b example has three of the /DATA entry lines 58. It should be noted that a difference between the sum file 46a discussed previously herein and the DTL file 46b is that the DTL file 46b has only one set of the /DATA entry lines 58 which contains all of the data required to build the reports defined within all of the report sections 50 (50c and 50d, in this example) within the DTL file 46b. As previously discussed herein in relation to the sum files 46a example of FIG. 4, in actual practice, it is anticipated that the data in the DTL file 46b will constitute the information which the user wishes to obtain from the report, rather than merely reciting the position of such data in the report as does the data of this simple example.

As in the sum files 46a (FIG. 4), it is anticipated that additional lines Data Entry of may readily placed within the alternate (DTL) intermediate file 46b. Indeed, it is anticipated by the inventors that it may be convenient to place lines within the DTL file 46b so as to make the DTL file 46b format compatible with other data files that might be used in conjunction with, or in the same environment as this present invention.

It is anticipated that, in setting up an iteration of the present invention, a person designing the system will determine which file structure (sum, DTL, or some other yet to be developed) might be best for the particular type of data base, data, and reports to be viewed. This decision will be made in light of the varying characteristics of these files as will be discussed hereinafter, and further in light of particular requirements of the specific application. It should be noted that the present invention could be practiced entirely with the DTL type files, or some other type of file having the characteristics of the DTL file 46b as discussed herein. The inclusion of the sum file 46a in this example serves merely to illustrate that some combination of the DTL files with the sum files, or with some other type of file, is possible within the scope of the invention.

As can be seen in this example, the use of the inventive DTL file format reduces the overall size of the intermediate file 46, in that the data is generally not repeated. Rather the metadata statements merely indicate which portions of the following data need be parsed to produce each of the reports defined in the metadata statements.

Figure 5:
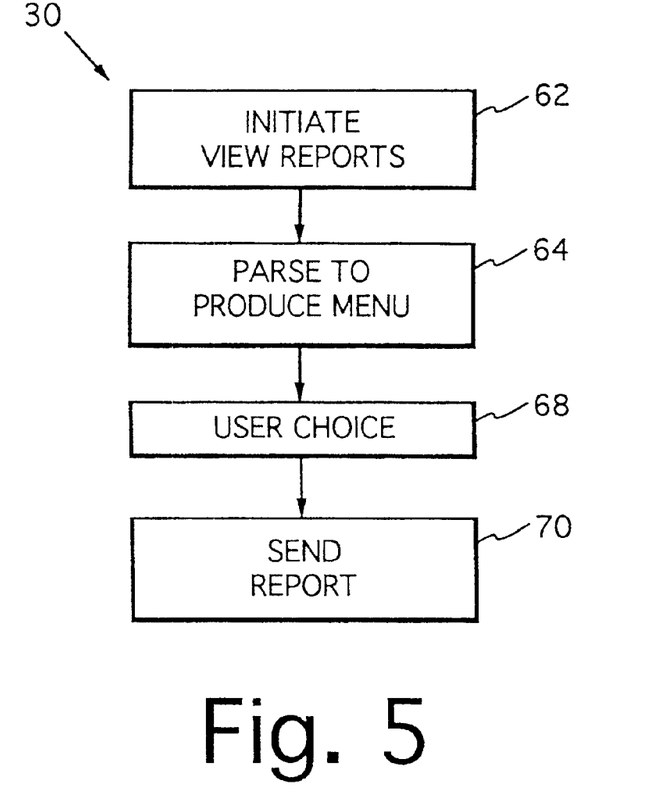
FIG. 5 is a more detailed block diagram showing an example of the subparts of the view reports operation of FIG. 1.
Figure 6:
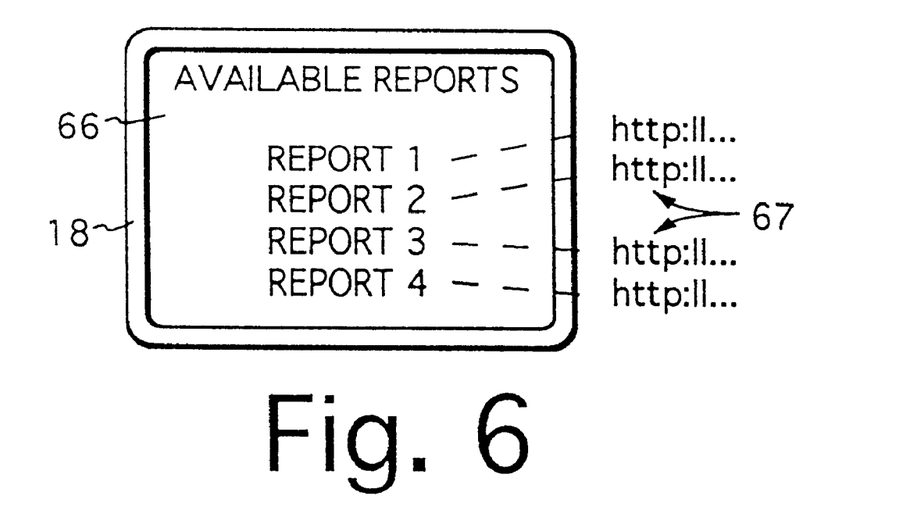
FIG. 6 is a simple example of a menu according to the present invention.

FIG. 5 is a more detailed block diagram showing an example of the subparts of the view reports operation 30 of FIG. 1. When a user wishes to see a report, the user will send to the internet 16 from the browser 14 a URL link to a view reports program 60 (FIG. 2). This is indicated in the view of FIG. 5 as an initiate view reports operation 62. Thereupon the view reports program will parse the intermediate file(s) 46 to obtain the data required to produce a menu in a parse to produce menu operation 64. FIG. 6 is an example of a simple menu 66 shown on the display screen 18. Each entry of the menu 66 will, upon being selected, cause to be generated an example of a URL 67 which is associated with each of the available reports (that is, reports produced according to the metadata and data of the intermediate file 46, in this example).

Using conventional browser functions, when the user clicks on a choice (in this example, either Report1, Report2, Report 3 or Report 4) the corresponding URL is sent over the internet 16 and received at the server 12 in a user choice operation 68. Whereupon, in this example, an HTML file is created and sent as a string over the internet 16 to the browser 14 in a send report operation 70. It should be noted that, in this example of the present invention, communications from the server 12 to the browser are sent as a data string along with an identifier as to content type.

Figure 7:
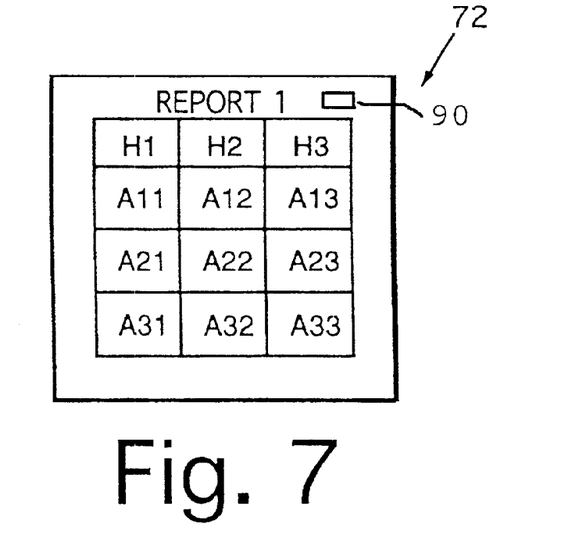
FIG. 7 is an example of a report such as might be generated according to the present invention.

FIG. 7 is an example of a report 72 such as might be generated according to this present example when the user has selected Report 1 from the menu 66 (FIG. 6). As can be seen in the example of FIG. 7, the domain headings (H1, H2, H3) appear at the top of columns containing the relevant data.

An additional feature that is optionally provided in this present example is a drill down button 90 (FIG. 7). The drill down button 90 is provided when there is additional information about a particular portion of data in an intermediate file 46. It is anticipated that this feature will be quite flexible and may be used in many different ways. An example of the sort of data which might be accessed by the drill down button is shown in FIG. 4a. A report subsection 92 contains data essentially in a format alike to one of the intermediate files 46. While the report subsection 92 is shown in this simple example only under one of the /DATA entries 58, it is anticipated that such detailed information will be made available for many, or even all data portions in at least some of the report sections 50.

It should be noted that, herein, the server 12 (FIG. 2) indicates a combination of a computer and software running thereon, and the browser 14 likewise indicates a combination of a computer and software running thereon. Accordingly, both the server 12 and the browser 14 will generally be embodied as computers connected to the internet 16. The computerized operations of the present inventive method 10 may each be embodied in essentially any computer readable medium such the operations may each be accomplished by transferring the respective data from the computer readable medium to the server 12 computer and/or the browser 14 computer. Similarly, the operations described herein may be physically embodied in computer readable program code which may also be stored on a computer readable medium and transferred therefrom to the server 12, the browser 14, or any such computer.

All of the above are only some of the examples of available embodiments of the present invention. Those skilled in the art will readily observe that numerous other modifications and alterations may be made without departing from the spirit and scope of the invention. For example, it is anticipated that a button may be provided on the menu 66 to cause the intermediate files may be parsed either to generate input to a charting facility or to generate input to download Comma Separated Variable ("CSV") file for a table. The file can then be input to other commonly available charting applications or data formatting programs which use the CSV format files. Accordingly, the above disclosure is not intended as limiting and the appended claims are to be interpreted as encompassing the entire scope of the invention.

Since the report generating and viewing method 10 of the present invention may be readily produced and integrated into existing web servers and web browser systems and devices, and since the advantages as described herein are provided, it is expected that it will be readily accepted in the industry. For these and other reasons, it is expected that the utility and industrial applicability of the invention will be both significant in scope and long lasting in duration.

What is claimed is:

1. A computer report generating method for generating reports from data in a database, the method comprising:
   a) reading the database to access specified portions of data;
   b) generating an intermediate file including the accessed data, the data being organized by rows and columns, the intermediate file also including meta data that facilitates generation of a plurality of different available reports each incorporating at least one associated row and at least one associated column of the accessed data, the meta data having a plurality of report sections each defining an associated one of the available reports;
   c) storing the intermediate file in a data storage medium;
   d) receiving a request to generate a report in accordance with a specified one of the report sections of the intermediate file;
   e) accessing the intermediate file from the data storage medium; and
   f) parsing the intermediate file to produce a report defined by the specified report section.

2. The computer report generating method of claim 1, wherein:
   steps a, b, and c are accomplished when a user requests that the report be created.

3. The computer report generating method of claim 2, wherein:
   a message is sent from a browser, though the internet, to a server; and
   steps a, b, and c are performed within the server.

4. The computer report generating method of claim 1, wherein:
   steps d, e, and f are performed when a user requests to view the report.

5. The computer report generating method of claim 4, wherein:
   a message is sent from a browser, through the internet, to a server; and
   steps d, e, and f are performed within the server.

6. The computer report generating method of claim 1, wherein:
   steps d, e, and f can be accomplished upon a request from a browser after the intermediate files are created.

7. The computer report generating method of claim 1, wherein said steps d and e further include:
   parsing the intermediate file to create a menu of the available reports, each of the available reports being defined by an associated one of the report sections; and
   enabling a user to select from the available reports.

8. The computer report generating method of claim 7, wherein:
   steps a, b, and c are accomplished in a server; and
   the report is sent to a browser to be viewed by the user after performance of steps d, e, and f.

9. The computer report generating method of claim 7, wherein:
   steps a, b, and c are accomplished in a server; and
   the report is sent over the internet to be viewed by the user after performance of steps d, e, and f.

10. The computer report generating method of claim 1, wherein:
    the report is in hyper text markup language format.

11. The computer report generating method of claim 1, wherein each of the report sections of the meta data includes:
    a chart entry indicating a beginning of the associated report section;
    a subtitle entry indicating a name of the associated report section;
    a domain label entry listing a domain name associated with a heading of a corresponding one of the columns of the associated report section; and
    a data entry line for each entry in a column of the associated report section.

12. A computer program product comprising a computer usable medium having a computer readable code embodied thereon configured to operate on a computer, comprising:
    a report generating program for performing the steps of,
       a) reading a database to access specified portions of data,
       b) generating an intermediate file including the accessed data, the data being organized by rows and columns, the intermediate file also including meta data that facilitates generation of a plurality of different available reports each incorporating at least one associated row and at least one associated column of the accessed data, the meta data having a plurality of report sections each defining an associated one of the available reports, and
       c) storing the intermediate file in a data storage medium; and a report viewing program for performing the steps of,
       d) receiving a request to generate a report in accordance with a selected one of the report sections of the intermediate file, e) accessing the intermediate file from the data storage medium, and f) parsing the intermediate file to produce a report defined by the selected report section.

13. The computer program product of claim 12, wherein each of the report sections of the meta data includes:

a chart entry indicating a beginning of the associated report section;

a subtitle entry indicating a name of the associated report section;

a domain label entry listing a domain name associated with a heading of a corresponding one of the columns of the associated report section; and a data entry line for each entry in a column of the associated report section.

14. The computer program product of claim 12, wherein:

said report generating program and said report viewing program reside in a server which is accessible through the internet from a browser.

15. The computer program product of claim 12, wherein:

said report viewing program is initiated when a request is sent from a browser to view the report.

16. The computer program product of claim 12, wherein:

the report viewing program parses the intermediate file to produce an index.

17. The computer program product of claim 12, wherein:

the report viewing program parses the intermediate file to generally simultaneously derive the information necessary to produce an index of available reports, and further to derive the information necessary to produce the report.

18. The computer program product of claim 12, wherein:

more than one intermediate file is produced.

19. The computer program product of claim 12, wherein:

more than one report is available to be selected from an index when the report viewing program is initiated.

* * * * *